(12) United States Patent
Baxter, Jr. et al.

(10) Patent No.: US 6,777,506 B1
(45) Date of Patent: Aug. 17, 2004

(54) APPARATUS FOR PREPARING POLYOLEFIN PRODUCTS AND METHODOLOGY FOR USING THE SAME

(75) Inventors: C. Edward Baxter, Jr., League City, TX (US); Daniel Herndon, League City, TX (US); James G. Wakeland, Humble, TX (US); Russel T. Reid, Sr., Dayton, TX (US); Gilbert Valdez, Pearland, TX (US)

(73) Assignee: Texas Petrochemicals, LP, Houston, TX (US)

( * ) Notice: Subject to any disclaimer, the term of this patent is extended or adjusted under 35 U.S.C. 154(b) by 0 days.

(21) Appl. No.: 10/757,748

(22) Filed: Jan. 15, 2004

Related U.S. Application Data

(62) Division of application No. 10/434,805, filed on May 9, 2003.

(51) Int. Cl.$^7$ .................................................. C08F 2/40
(52) U.S. Cl. ........................... 526/64; 526/88; 526/133
(58) Field of Search ............................. 526/64, 88, 133

(56) References Cited

U.S. PATENT DOCUMENTS

| | | |
|---|---|---|
| 132,264 A | 10/1872 | Eames et al. |
| 2,139,038 A | 12/1938 | Russell |
| 2,379,656 A | 7/1945 | Ruthruff |

(List continued on next page.)

FOREIGN PATENT DOCUMENTS

| | | |
|---|---|---|
| CA | 2195575 | 2/1996 |
| CA | 2217848 | 12/1996 |
| DE | 27 02 604 | 7/1978 |
| DE | 199 52 030 | 5/2001 |
| EP | 0 145 235 A1 | 6/1985 |
| EP | 0 279 456 A1 | 8/1988 |
| EP | 0 322 241 A1 | 6/1989 |
| EP | 0 355 997 A1 | 2/1990 |
| EP | 0 400 905 A1 | 12/1990 |
| EP | 0 481 297 A2 | 4/1992 |
| EP | 0 628 575 A1 | 12/1994 |
| EP | 0 671 419 A1 | 9/1995 |
| EP | 0 831 141 | 3/1998 |
| EP | 0 628 022 B1 | 11/1998 |
| GB | 1159368 | 7/1969 |
| GB | 1592016 | 7/1981 |
| GB | 2 181 145 | 4/1987 |
| WO | WO 93/10063 | 5/1993 |
| WO | WO 94/14739 | 4/1994 |
| WO | WO 99/31151 | 6/1999 |
| WO | WO 01/19873 | 3/2001 |

*Primary Examiner*—William K. Cheung
(74) *Attorney, Agent, or Firm*—James H. Marsh, Jr.; Stinson Morrison Hecker LLP

(57) ABSTRACT

Apparatus for olefin polymerization includes a plurality of shell and tube olefin polymerization reactors, each of which has an olefin polymerization reaction mixture inlet connection and a crude polyolefin product outlet connection. Each reactor is equipped with a recirculation system including a pump arranged to circulate a reaction mixture through the tube side of the reactor independently of the introduction of olefin polymerization reaction mixture into the reactor. The apparatus also includes an inlet reaction mixture distribution manifold and an outlet polymerization reaction mixture collection manifold interconnecting the reactors for operation in parallel. The apparatus also includes catalyst composition and catalyst modifier inlets for each reactor arranged such that a catalyst modifier to may be introduced into each reactor at a rate which is independent of the introduction of catalyst composition. The apparatus further incorporates a crude polyolefin product catalyst removal and wash system including a plurality of settler vessels, associated piping and an inlet for a catalyst killing agent. This crude polyolefin product catalyst removal and wash system operates to receive crude polyolefin product from the crude polyolefin product outlet and remove residual catalyst therefrom.

6 Claims, 3 Drawing Sheets

U.S. PATENT DOCUMENTS

| | | |
|---|---|---|
| 2,407,494 A | 9/1946 | Hartvigsen |
| 2,411,097 A | 11/1946 | Kopp |
| 2,559,062 A | 7/1951 | Domte |
| 2,559,984 A | 7/1951 | Montgomery et al. |
| 2,727,022 A | 12/1955 | Linsk |
| 2,833,840 A | 5/1958 | Longwell |
| 2,856,395 A | 10/1958 | Richard, Jr. et al. |
| 2,889,370 A | 6/1959 | Schechter |
| 2,918,508 A | 12/1959 | Coopersmith et al. |
| 3,024,226 A | 3/1962 | Nolan, Jr. |
| 3,166,546 A | 1/1965 | Nolan, Jr. |
| 3,284,537 A | 11/1966 | Webb, Jr. |
| 3,306,907 A | 2/1967 | McNinch |
| 3,346,354 A | 10/1967 | Kautsky et al. |
| 3,382,291 A | 5/1968 | Brennan |
| 3,634,383 A | 1/1972 | Miller, Jr. |
| 3,726,842 A | 4/1973 | Treischmann et al. |
| 3,778,487 A | 12/1973 | Driscoll et al. |
| 3,780,128 A | 12/1973 | Shubkin |
| 3,849,085 A | 11/1974 | Kreuz et al. |
| 3,927,041 A | 12/1975 | Cengel et al. |
| 3,935,249 A | 1/1976 | Puskas et al. |
| 3,991,129 A | 11/1976 | Daniels |
| 4,110,521 A | 8/1978 | Barnett et al. |
| 4,152,499 A | 5/1979 | Boerzel et al. |
| 4,227,027 A | 10/1980 | Booth et al. |
| 4,231,759 A | 11/1980 | Udelhofen et al. |
| 4,238,628 A | 12/1980 | Cahill et al. |
| 4,242,531 A | 12/1980 | Carter |
| 4,311,808 A | 1/1982 | Su |
| 4,383,093 A | 5/1983 | Shiraki et al. |
| 4,391,959 A | 7/1983 | Fauth et al. |
| 4,400,493 A | 8/1983 | Abernathy, Jr. et al. |
| 4,429,099 A | 1/1984 | Kennedy et al. |
| 4,433,197 A | 2/1984 | Vogel et al. |
| 4,558,104 A | 12/1985 | Bronstert et al. |
| 4,605,808 A | 8/1986 | Samson |
| 4,663,406 A | 5/1987 | Bronstert et al. |
| 4,691,072 A | 9/1987 | Schick et al. |
| 4,849,572 A | 7/1989 | Chen et al. |
| 4,883,847 A | 11/1989 | Leung et al. |
| 4,914,166 A | 4/1990 | Kennedy et al. |
| 4,943,616 A | 7/1990 | Mishra et al. |
| 4,956,512 A | 9/1990 | Nissfolk et al. |
| 4,973,733 A | 11/1990 | Valkovich et al. |
| 4,982,042 A | 1/1991 | Akatsu et al. |
| 5,068,490 A | 11/1991 | Eaton |
| 5,175,225 A | 12/1992 | Ruhe, Jr. |
| 5,191,044 A | 3/1993 | Rath et al. |
| 5,192,335 A | 3/1993 | Cherpeck |
| 5,254,649 A | 10/1993 | Miln et al. |
| 5,254,784 A | 10/1993 | Nurminen et al. |
| 5,286,823 A | 2/1994 | Rath |
| 5,300,701 A | 4/1994 | Cherpeck |
| 5,408,018 A | 4/1995 | Rath |
| 5,439,991 A | 8/1995 | Colman et al. |
| 5,448,001 A | 9/1995 | Baird |
| 5,563,313 A | 10/1996 | Chung et al. |
| 5,710,225 A | 1/1998 | Johnson et al. |
| 5,731,379 A | 3/1998 | Kennan et al. |
| 5,733,993 A | 3/1998 | Yu et al. |
| 5,767,334 A * | 6/1998 | Nissfolk et al. ............ 585/525 |
| 5,779,742 A | 7/1998 | Baker |
| 5,792,729 A | 8/1998 | Harrison et al. |
| 5,811,616 A * | 9/1998 | Holub et al. ................ 585/504 |
| 5,814,706 A | 9/1998 | Yu et al. |
| 5,910,550 A | 6/1999 | Rath |
| 5,962,604 A | 10/1999 | Rath |
| 5,977,251 A | 11/1999 | Kao et al. |
| 6,132,827 A | 10/2000 | Miro |
| 6,361,856 B1 | 3/2002 | Wakai et al. |
| 6,384,154 B1 | 5/2002 | Sigwart et al. |
| 6,407,186 B1 | 6/2002 | Rath et al. |
| 6,441,110 B1 | 8/2002 | Sigwart et al. |
| 6,562,913 B1 | 5/2003 | Baxter, Jr. et al. |

* cited by examiner

APPARATUS FOR PREPARING POLYOLEFIN PRODUCTS AND METHODOLOGY FOR USING THE SAME

CROSS REFERENCE TO RELATED APPLICATIONS

This application is a divisional of and claims priority pursuant to 35 U.S.C. § 120 from co-pending application Ser. No. 10/434,805, filed May 9, 2003. The entirety of the disclosure of said prior application Ser. No. 10/434,805 is hereby specifically incorporated herein by this specific reference thereto.

BACKGROUND OF THE INVENTION

1. Field of the Invention

The present invention relates to liquid phase olefin polymerization, to the preparation of polyolefin products and to apparatus useful in the preparation of polyolefin products. In particular the present invention relates to apparatuses and equipment for the preparation of a variety of polyolefin products using a liquid phase polymerization process and to the methodology used in the operation of such apparatuses and equipment. More particularly, the present invention relates to apparatus and methodology which enhances the operation and control of polyolefin reactors.

2. Background of the Invention

Presently pending U.S. patent application Ser. No. 09/515,790 filed on Feb. 29, 2000 and entitled "Process For Producing High Vinylidene Polyisobutylene" (hereinafter the '790 application) relates to liquid phase polymerization processes for preparing low molecular weight, highly reactive polyisobutylene. In accordance with the disclosure of the '790 application, a catalyst composition, which desirably may comprise a complex of $BF_3$ and methanol, and a feedstock containing isobutylene, are each introduced into a reaction zone where the same are intimately admixed with residual reaction mixture so as to present an intimately intermixed reaction admixture in the reaction zone. The intimately intermixed reaction admixture is maintained in its intimately intermixed condition and at a relatively constant temperature of at least about 0° C. while the same is in the reaction zone, whereby isobutylene therein is polymerized to form polyisobutylene (PIB) having a high degree of terminal unsaturation. A crude product stream comprising residual catalyst composition, unreacted isobutylene and polyisobutylene is then withdrawn from the reaction zone. The introduction of feedstock into and the withdrawal of product stream from the reaction zone are each controlled such that the residence time of the isobutylene undergoing polymerization in the reaction zone is no greater than about 4 minutes, whereby the product stream contains a highly reactive polyisobutylene product. Preferably, the reaction zone may be the tube side of a shell-and-tube exchanger in which a coolant is circulated on the shell side. A recirculation loop may desirably be employed to circulate the reaction admixture through the tube side reaction zone at a linear velocity sufficient to establish and maintain an intimately intermixed condition in the admixture and remove heat generated by the exothermic polymerization reaction.

U.S. Pat. No. 6,525,149 issued on Feb. 25, 2003 and entitled "Process For Preparing Polyolefin Products" (hereinafter the '149 patent) relates to a novel liquid phase polymerization process for preparing a polyolefin product having preselected properties. The process of the '149 patent includes the steps of providing a liquid feedstock which contains an olefinic component and a catalyst composition which may comprise a stable complex of $BF_3$ and a complexing agent. The feedstock may comprise any one or more of a number of olefins, including branched olefins such as isobutylene, $C_3$–$C_{15}$ linear alpha olefins and $C_4$–$C_{15}$ reactive non-alpha olefins. The feedstock and the catalyst composition may desirably be introduced into a residual reaction mixture recirculating in a loop reactor reaction zone provided on the tube side of a shell and tube heat exchanger at a recirculation rate sufficient to cause intimate intermixing of the residual reaction mixture, the added feedstock and the catalyst composition. The heat of the polymerization reaction is removed from the recirculating intimately intermixed reaction admixture at a rate calculated to provide a substantially constant reaction temperature therein while the same is recirculating in the reaction zone. The conditions in the reactor are appropriate for causing olefinic components introduced in the feedstock to undergo polymerization to form the desired polyolefin product in the presence of the catalyst composition. A crude product stream containing the desired polyolefin product, unreacted olefins and residual catalyst composition is withdrawn from the reaction zone. The introduction of the feedstock into the reaction zone and the withdrawal of the product stream from the reaction zone are controlled such that the residence time of the olefinic components undergoing polymerization in the reaction zone is appropriate for production of the desired polyolefin product.

U.S. Patent publication 2003-0040587 A1 published on Feb. 27, 2003 and entitled "Mid-Range Vinylidene Content Polyisobutylene Polymer Product And Process For Producing The Same" (hereinafter the '587 publication) describes a mid-range vinylidene content PIB polymer product and a process for making the same. In accordance with the disclosure of the '587 publication, at least about 90% of the PIB molecules present in the product comprise alpha or beta position isomers. The alpha (vinylidene) isomer content of the product may range from 20% to 70% thereof, and the content of tetra-substituted internal double bonds is very low, preferably less than about 5% and ideally less than about 1–2%. The mid-range vinylidene content PIB polymer products are desirably prepared by a liquid phase polymerization process conducted in a loop reactor similar to the reactors described in the '790 application and the '587 patent at a temperature which desirably may be about 60° F. or higher using a $BF_3$/methanol catalyst complex and a contact time of no more than about 4 minutes.

The '790 application, the '587 publication and the '149 patent are each assigned to the assignee of the present application, and the entireties of the respective disclosures thereof are specifically incorporated herein by this reference thereto.

In conducting the reactions described above, highly specialized equipment may often be employed to enhance the operation and control of the polymerization reactors. In each case, for example, the crude product leaving the reactor may be contaminated with residual catalyst which desirably should be quickly quenched or killed to avoid further polymerization of monomers and low molecular weight oligomers without appropriate cooling and/or isomerization resulting from shifting of the position of the remaining double bond. The catalyst composition may be subjected to contamination by residual materials recirculating with the reaction admixture during the conduct of the polymerization reaction. Moreover, as in any industrial activity, methodology and/or equipment for enhancing capacity and throughput are sought continually.

SUMMARY OF THE INVENTION

It is an important aim of the present invention to satisfy the needs discussed above. In this regard, in one very important aspect of the invention, the same provides apparatus for olefin polymerization which includes a plurality of reactors. In accordance with the concepts and principles of the invention, each of these reactors desirably may comprise structure defining a reaction zone, an olefin polymerization reaction mixture inlet connection and a olefin polymerization reaction mixture outlet connection. These connections desirably are in fluid communication with the reaction zone. The reactors are each adapted and arranged to facilitate the conduct of an exothermic olefin polymerization reaction in the reaction zone.

In further accordance with the concepts and principles of the invention, each of the reactors also may include a recirculation system including a pump arranged and adapted to circulate the reaction mixture in the reaction zone independently of the introduction of olefin containing feedstock into the reactor.

The apparatus of the invention also desirably includes an olefin containing feedstock distribution assembly that comprises an olefin containing feedstock inlet and a plurality of olefin containing feedstock outlets. The arrangement of the distribution assembly being such that each of the feedstock outlets is connected in fluid communication with the reaction zone of a respective reactor. The apparatus of the invention may also desirably include a product collection assembly including a plurality of crude polyolefin product inlets and a crude polyolefin product outlet, the arrangement of the collection assembly being such that each of the crude polyolefin product inlets is connected in fluid communication with the reaction zone of a respective reactor.

Broadly, the apparatus of the invention may include two or more of the reactors, for example three or four or five or six or more of the reactors.

In another important aspect of the invention, the same provides a method for olefin polymerization. In accordance with the invention, the method includes providing a plurality of reactors, each of which defines an internal reaction zone. The method also includes supplying an olefin containing feedstock, dividing such feedstock into a plurality (2, 3, 4, 5, 6 or more) of separate feedstock streams, introducing each of the feedstock streams into a reaction mixture circulating in the reaction zone of a respective one of the reactors, and conducting an exothermic olefin polymerization reaction in each of the reaction zones.

The method of this aspect of the invention also includes the steps of separately circulating the reaction mixture in each reactor independently of the introduction of the respective stream of feedstock into the reaction mixture, removing a respective crude polyolefin product stream from the reaction mixture circulating in each of the reactors, and combining the crude polyolefin product streams to form a single crude product stream.

In another aspect, the invention provides a reactor apparatus for olefin polymerization which comprises at least one reactor defining a reaction zone and including an olefin polymerization reaction mixture inlet connection and an olefin polymerization reaction mixture outlet connection. These connections may desirably be in fluid communication with the reaction zone. The reactor is adapted and arranged to facilitate the conduct in the reaction zone of an exothermic olefin polymerization reaction on the reaction mixture in the presence of a catalyst composition comprising a catalyst and a catalyst modifier. In accordance with this aspect of the invention, the reactor apparatus further includes a feedstock inlet, a crude product outlet and a recirculation system including a pump arranged and adapted to circulate the reaction mixture in the zone independently of the introduction of feedstock into the reaction mixture via said feedstock inlet. The reactor apparatus of this aspect also includes a catalyst composition inlet in fluid communication with the zone facilitating the addition of catalyst composition to the olefin polymerization reaction mixture and at least one catalyst modifier inlet in fluid communication with the zone facilitating the addition of catalyst modifier to the olefin polymerization reaction mixture at a rate that is independent of the rate of addition of the catalyst composition.

Another important feature of the invention includes the provision of a method for operating an olefin polymerization reactor. This method includes the steps of providing an olefin polymerization reactor having a reaction zone, recirculating an olefin polymerization reaction mixture in the zone, introducing an olefin containing feedstock into said reaction mixture, said polymerization reaction mixture being recirculated at a flow rate which is independent of the rate of introduction of the feedstock into the recirculating olefin polymerization reaction mixture, introducing a catalyst composition comprising a catalyst and a catalyst modifier into the recirculating olefin polymerization reaction mixture, subjecting the polymerization reaction mixture to exothermic olefin polymerization reaction conditions in the zone in the presence of the catalyst composition, and introducing a catalyst modifier into the recirculating olefin polymerization reaction mixture at a rate that is independent of the rate of introduction of the catalyst composition.

In accordance with the concepts and principles of the invention, the foregoing system and methodology may be used in connection with a system and/or methodology which includes only a single reactor vessel or with one which includes a plurality of reactor vessels arranged in parallel as described above. In this regard, it is to be noted that in accordance with the invention, the invention further provides an apparatus and/or a method which includes a multi-reactor system as described above in combination with the described system for introducing catalyst modifier into the recirculating reaction mixture at a rate that is independent of the rate of introduction of the catalyst composition.

It is an additional aspect of the invention to provide a crude polyolefin product catalyst removal and wash system. In accordance with this aspect of the invention, the catalyst removal and wash system comprises an upstream settler vessel defining an internal settlement chamber adapted and arranged for receiving a mixture of a crude polyolefin product and an aqueous wash media and allowing the product and the media to separate therein under the influence of gravity. The system further includes a crude, catalyst containing olefin polymerization product inlet line in fluid communication with the chamber of the upstream settler vessel, a catalyst killing agent inlet conduit in fluid communication with the chamber of the upstream settler vessel, and a first make-up water inlet passageway in fluid communication with the chamber of the upstream settler vessel.

In addition to the foregoing, the catalyst removal and wash system desirably includes a downstream settler system including at least one downstream settler vessel defining an internal settlement chamber adapted and arranged for receiving a mixture of a partially washed crude polyolefin product and an aqueous wash media and allowing the product and the media to separate therein under the influence of gravity, an overhead, partially washed polyolefin product line intercommunicating the chamber of the upstream settler vessel with the downstream settler system, a washed crude olefin polymerization product outlet line in fluid communication with the downstream settler system and a second make-up water inlet passageway in fluid communication with the downstream settler system. Finally, the system includes a first drain line intercommunicating the chamber of the upstream settler vessel with an inlet connection to a waste water receiving system, and a second drain line intercommunicating the downstream settler system with the inlet connection to the waste water receiving system. Thus, used wash water from the upstream and downstream portions of the system may be purged separately from the system.

In accordance with the foregoing aspect of the invention, the downstream settler system may include one or two or three or more separate settler vessels Yet another important feature of the invention is the provision of a method for treating a catalytically formed crude polyolefin product containing residual catalyst to avoid further reaction in the product and remove residual catalyst therefrom. In accordance with this aspect of the invention, the method comprises intimately admixing crude residual catalyst containing polyolefin product and a first aqueous media containing a catalyst killing agent to thereby form a first intimately admixed two phase, gravity separable mixture, introducing the first two phase mixture into a first settlement zone and allowing the same to settle in the first zone under the influence of gravity to present an upper partially washed crude polyolefin product phase and a first lower aqueous phase containing dissolved catalyst salts, withdrawing the first lower aqueous phase from the first settlement zone and recirculating a first portion thereof and introducing the same into the first two phase mixture for inclusion as part of the first aqueous media, directing a second portion of the first lower aqueous phase to a drain for disposal or reclamation, introducing a first quantity of make-up water into the first two phase mixture for inclusion as part of the first aqueous media, withdrawing the partially washed crude polyolefin product phase from the first settlement zone and intimately admixing the same with a second aqueous media to thereby form a second intimately admixed two phase, gravity separable mixture, introducing the second two phase admixture into a second settlement zone and allowing the same to settle in the second zone under the influence of gravity to present an upper more fully washed crude polyolefin product phase and a second lower aqueous phase, withdrawing the second lower aqueous phase from the second settlement zone and recirculating a first portion thereof and introducing the same into the second two phase mixture for inclusion as part of the second aqueous media, directing a second portion of the second lower aqueous phase to a drain for disposal or reclamation, removing the more fully washed crude polyolefin product phase from the second settlement zone, and introducing a second separate quantity of make-up water into the second two phase mixture for inclusion as part of the second aqueous media.

It is to be noted that the catalyst removal and wash system and/or method described above is suitable for use in connection with either a system which includes only a single reactor as well as one which includes a plurality of reactors as described above. Thus, it is an important aspect of the invention to provide a system and/or method which includes both a multi reactor system and a catalyst removal and wash system and/or method as described. In addition, such combined system may also include the described system for adjusting the amount of catalyst modifier in the recirculating reaction mixture.

DETAILED DESCRIPTION OF THE PREFERRED EMBODIMENTS

Figure 1:
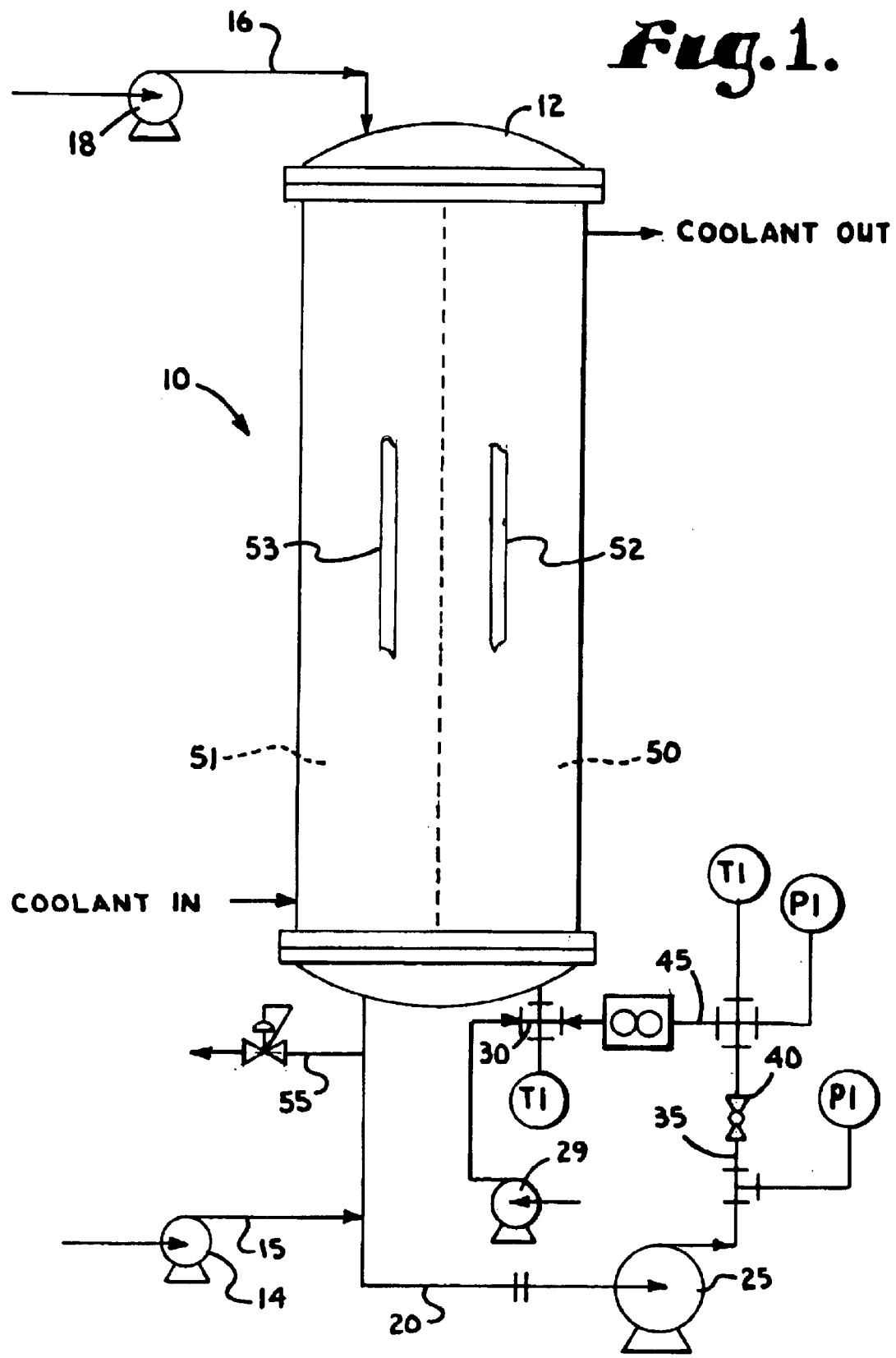
FIG. 1 is a schematic illustration of a reactor system including a multi-pass shell and tube heat exchanger and a recirculation system which is useful in connection with the invention.

Many potentially valuable reactors having utility in the conduct of liquid phase polymerization polyolefins are known to the routineers in the art to which the invention pertains. However, for purposes of one preferred embodiment of the present invention, the reactor desirably may include a two-pass shell-and-tube heat exchanger as shown in FIG. 1, where the same is identified by the numeral 10. The reactor 10 may, for example, include three hundred eighty eight (388) 0.375" tubes with a wall thickness of 0.035", each thereby providing an internal tube diameter of 0.305". The reactor may be twelve feet long and may have internal baffling and partitions to provide 2 passes with 194 tubes per pass. The passes are identified by the numerals 50 and 51 in FIG. 1, and the 194 tubes of each pass are respectively represented by the single tube portions 52 and 53. Such construction is well known in the heat exchanger and reactor arts and no further explanation is believed necessary.

In operation, an olefin (e.g., isobutylene, 1-butene, 2-butene) containing feedstock enters the reactor system via pump 14 and pipe 15. The downstream end of pipe 15 desirably may be located to direct the feed stock into the suction line 20 of recirculation pump 25. A catalyst composition may be injected into the reactor circulation system via pump 29 and pipe 30 at a location downstream from pump 25 and adjacent the first pass as shown in FIG. 1. The catalyst composition may desirably be a methanol/$BF_3$ complex with a molar ratio of methanol to $BF_3$ of about 1.9:1 or less and preferably may be a methanol/$BF_3$ complex with a molar ratio of methanol to $BF_3$ of about 1.7:1 or less. Desirably the molar ratio of methanol to $BF_3$ may be as low as about 1.1:1 or less for some applications.

Circulation pump 25 pushes the reaction mixture through line 35, control valve 40 and line 45 into the bottom head 11 of the reactor 10. A flow meter 46 may be positioned in line 45 as shown. Appropriate temperature indicators TI and pressure indicators PI may be provided to monitor the system. The reaction mixture travels upwardly through tubes 52 of pass 50 and downwardly through tubes 53 of pass 51. The circulating reaction mixture leaves reactor 10 via suction line 20. The reactor system thus is of the type which is sometimes referred to as a loop reactor. With this system, which is only a preferred system since there are many other arrangements which would be apparent to those of ordinary skill in the art, the flow rate of the reactant mixture in the reactor may be adjusted and optimized independently of feed stock introduction and product removal rates so as to achieve thorough intermixing of the catalyst composition and the reactants and appropriate temperature control.

As explained previously, each pass 50 and 51 may desirably include one hundred ninety four (194) separate tubes. For clarity, however, only a portion of a single tube is illustrated schematically in each pass in FIG. 11. These tubes are identified by the respective reference numerals 52 and 53. Although only a portion of each representative tube 52 and 53 is shown, it should be appreciated by those skilled in the art that each of these tubes extends for the entire distance between top head 12 and bottom head 11 and that the same are in fluid communication with the interiors of heads 11 and 12.

It is to be noted here, that the reaction mixture should preferably be circulated through the tubes 52, 53 of the reactor at a flow rate sufficient to cause turbulent flow, whereby to achieve intimate intermixing between the catalyst composition and the reactants and a heat transfer coefficient appropriate to provide proper cooling. In this regard, the flow rate, the reaction mixture properties, the reaction conditions and the reactor configuration should be appropriate to produce a Reynolds number (Re) in the range of from about 2000 to about 3000 and a heat transfer coefficient (U) in the range of from about 50 to about 150 Btu/min ft$^{2°}$ F. in the tubes 52, 53 of the reactor. Such parameters may generally be obtained when the linear flow rate of a typical reaction mixture through a tube having an internal diameter of 0.331 inch is approximately within the range of from about 6 to 9 feet per second.

A product exit line 55 may desirably be connected in fluid communication with pump suction line 20. However, as would be readily appreciated by those skilled in the art, the exit line could be positioned almost anywhere in the system since, at least from a theoretical view point, and as explained below, the conditions in the reactor may desirably approach those of a continuous stirred tank reactor (CSTR) where both temperature and composition remain constant such that the composition of the product stream leaving the reactor is identical to the composition of the reaction mixture recirculating in the reactor. Likewise, the feedstock introduction line 15 could be positioned almost anywhere in the system, although, in practice, it is desirable for the line 15 to be connected into the recirculation system at a position that is as far upstream from the line 55 as possible to insure that monomers introduce via line 15 have a maximum opportunity to polymerize before encountering line 55.

A coolant may desirably be circulated on the shell side of the reactor at a rate to remove heat of reaction and maintain a desired temperature in the reactor.

A catalyst complexing agent may desirably be added to the circulating reaction mixture via pump 18 and line 16 positioned in top head 12. This feature is particularly valuable when the desired product is highly reactive polyisobutylene (HR PIB) and the catalyst composition comprises a $BF_3$ catalyst and a methanol complexing agent. $BF_3$ complexes with methanol in two different forms, i.e., mono-complex (1 mole of $BF_3$ to 1 mole of methanol) and di-complex (1 mole of $BF_3$ to 2 moles of methanol), depending upon the availability of methanol. The mono-complex is the true catalytic species, whereas the di-complex does not have any particular catalytic properties in the absence of the mono-complex. References to fractional complexes are the actual average of the mono-complex and the di-complex. In this regard it has been determined that a catalyst composition made up of 0.59 to 0.62 moles of $BF_3$ per mole of methanol is particularly valuable in the production of HR PIB. But when such a composition is introduced into the system, variations and contaminants in the hydrocarbon feed often may result in less than optimal reactor control. This is believed to be, at least in part, the result of the propensity for many contaminants to effectively increase the apparent ratio of methanol to catalyst in the composition. Moreover, it is not always possible to predetermine the exact contamination level of some feedstocks.

In accordance with the concepts and principles of the invention, however, it has been discovered that these problems may be solved and optimal results may be achieved simply by introducing a catalyst composition, which for some purposes may desirably be a methanol lean composition, e.g., one containing more than the optimum desired concentration of the mono-complex, into the reactor 10 via line 30, and independently adding relatively pure methanol through a line that may desirably be spaced from line 30, such as the line 16. A pump 18 may desirably be provided to push the methanol through pipe 16. Alternatively, essentially the same effect may be achieved by introducing a separate methanol stream directly into the catalyst composition stream in line 30 by way of a line (not shown) and introducing the added methanol and the catalyst composition into the system together. In either event, the additional methanol is available to trim the catalyst composition so that a desired methanol to $BF_3$ ratio may be achieved and maintained in the reactor 10.

In further accordance with the concepts and principles of the invention, the amount of methanol added should desirably be sufficient to create and maintain a preferred ratio of $BF_3$ per mole of methanol in the circulating reaction mixture. For some applications, for example where a highly reactive polyisobutylene is the desired product, the catalyst composition added via line 30 may desirably comprise a molar ratio of $BF_3$ and methanol in the range of from about of 0.59:1 to about 0.62:1, and ideally may be about 0.61:1. Alternatively, for other applications, for example where the desired product is a polyisobutylene where the vinylidene content is not so important, the catalyst composition added via line 30 may ideally comprise a molar ratio of $BF_3$ and methanol of about 1:1.

The product exiting the system via line 55 should be quickly quenched with a material capable of killing the activity of the catalyst, such as, for example, ammonium hydroxide, so that the ongoing exothermic polymerization reactions are immediately stopped. Thus, any undesired temperature increase due to a lack of cooling (and the concomitant production of lower molecular weight polymers due to the higher temperatures) or rearrangement of the polymer molecules may be minimized. The polyolefin products of the invention may then be directed to a work up system, including a wash system as described below, where catalyst salts may be removed and a purification and separation system (not shown) where the polyolefin product may be separated from unreacted monomers, dimers, oligomers and other undesirable contaminants such as diluents, etc. These latter materials may then be recycled or diverted for other uses employing known methodology.

With the described recirculation system, the rate of feedstock introduction into the reaction mixture and the rate of product removal are each independent of the circulation rate. As will be appreciated by those of ordinary skill in the art, the number of passes through the reactor and the size and configuration of the latter are simply matters of choice. For a single reactor system as illustrated in FIG. 1, the feedstock and product withdrawal flow rates may preferably be chosen such that the residence time of the fresh monomers entering the reactor with the feedstock is 4 minutes or less, desirably 3 minutes or less, preferably 2 minutes or less, even more preferably 1 minute or less, and ideally less than 1 minute. In connection with the foregoing, the residence time is defined as the total reactor system volume divided by the volumetric flow rate of the feedstock entering the system via pipe 15.

The recirculation flow rate, that is the flow rate of the reaction mixture in the system induced by the recirculation pump 25, is controlled, as described above, to achieve appropriate turbulence and/or heat transfer characteristics. This recirculation flow rate is often a function of the system itself and other desired process conditions. For the systems described above, the ratio of the recirculation flow rate to the incoming feedstock flow rate (recycle ratio) should generally be maintained in the range of from about 20:1 to about 50:1, desirably in the range of from about 25:1 to about 40:1, and ideally in the range of from about 28:1 to about 35:1. In particular, in addition to causing turbulence and providing an appropriate heat transfer coefficient, the recirculation flow rate of the reaction mixture should be sufficient to keep the concentrations of the ingredients therein essentially constant and/or to minimize temperature gradients within the circulating reaction mixture, whereby essentially isothermal conditions are established and maintained in the reactor.

As mentioned above, the recycle ratios generally should be in the range of from about 20:1 to about 50:1. Higher recycle ratios increase the degree of mixing and the reactor approaches isothermal operation leading to narrower polymer distributions. But higher recycle ratios also result in higher power consumption. Lower recycle ratios decrease the amount of mixing in the reactor, and as a result, there is a greater discrepancy in the temperature profiles. As the recycle ratio approaches zero, the design equations for the reactor reduce to those for a plug flow reactor model. On the other hand, as the recycle ratio approaches infinity, the modeling equations reduce to those for a CSTR. When CSTR conditions are achieved, both temperature and composition remain constant and the composition of the product stream leaving the reactor is identical to the composition of the reaction mixture recirculating in the reactor. Needless to say, after equilibrium has been established, as feedstock enters the system, an equal mass of product is pushed out of the reactor loop. Thus, under CSTR conditions, the point at which the product stream is withdrawn is independent of reactor geometry.

The feedstock entering the system through line 15 may be any olefin containing stream. Where polyisobutylene is the preferred product, the feedstock may be, e.g., isobutylene concentrate, dehydro effluent, or a typical raff-1 stream. These feedstock materials are described respectively below in Tables 1, 2 and 3.

TABLE 1

Isobutylene Concentrate

| Ingredient | Weight % |
|---|---|
| $C_3s$ | 0.00 |
| I-butane | 6.41 |
| n-butane | 1.68 |
| 1-butene | 1.30 |
| I-butene | 89.19 |
| trans-2-butene | 0.83 |
| cis-2-butene | 0.38 |
| 1,3-butadiene | 0.21 |

TABLE 2

Dehydro Effluent

| Ingredient | Weight % |
|---|---|
| $C_3s$ | 0.38 |
| I-butane | 43.07 |

TABLE 2-continued

Dehydro Effluent

| Ingredient | Weight % |
|---|---|
| n-butane | 1.29 |
| 1-butene | 0.81 |
| I-butene | 52.58 |
| trans-2-butene | 0.98 |
| cis-2-butene | 0.69 |
| 1,3-butadiene | 0.20 |

TABLE 3

Raff-1

| Ingredient | Weight % |
|---|---|
| $C_3s$ | 0.57 |
| I-butane | 4.42 |
| n-butane | 16.15 |
| 1-butene | 37.22 |
| I-butene | 30.01 |
| trans-2-butene | 8.38 |
| cis-2-butene | 2.27 |
| 1,3-butadiene | 0.37 |
| MTBE | 0.61 |

On the other hand, suitable streams for the production of polyolefins generally include feedstock materials such as those described in Tables 4 and 5.

TABLE 4

2-Butene Rich Stream

| Ingredient | Weight % |
|---|---|
| I-butane | 2.19 |
| n-butane | 61.50 |
| 1-butene | 0.64 |
| trans-2-butene | 28.18 |
| cis-2-butene | 7.49 |

TABLE 5

1-Decene Rich Stream

| Ingredient | Weight % |
|---|---|
| 1-decene | 94.00 |
| $C_{10}$ isomers | 6.00 |

Figure 2:
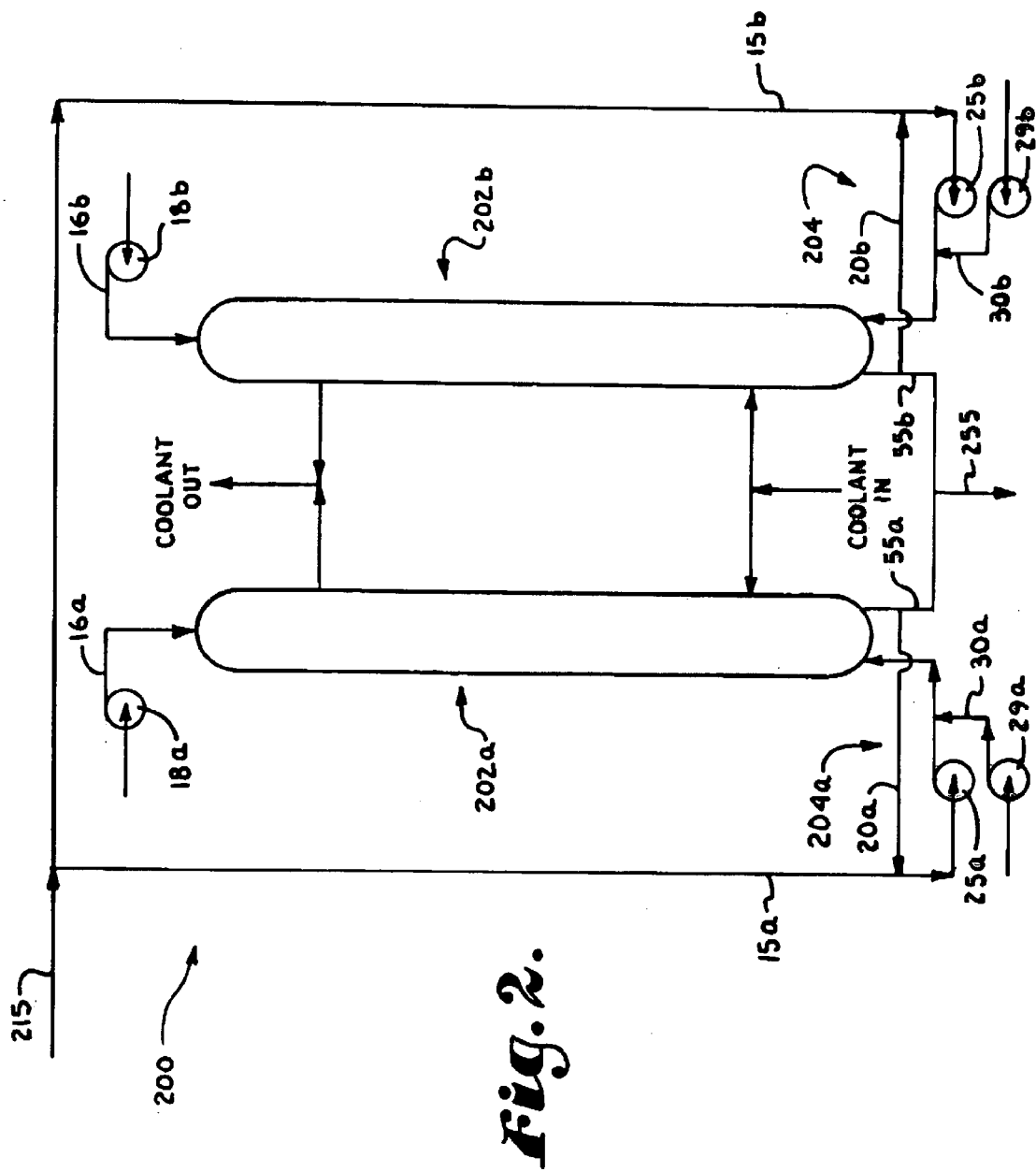
FIG. 2 is a flow diagram illustrating an apparatus which embodies the concepts and principles of the invention and which employs two reactors of the sort illustrated in FIG. 1 arranged for operation in parallel.

With reference to FIG. 2, and in further accordance with the concepts and principles of the invention, it has been discovered unexpectedly that an operating system incorporating a plurality of reactors arranged for operation in parallel provides a great deal more operating flexibility than a single larger reactor sized for the same total production rate. In fact, the multiple reactor concept of the invention provides for less risk in operation, more flexibility in running the process, lower feed rates (higher conversions), improved reactor design, and increased production capability per unit of time. Moreover, the multiple reactor concept of the invention allows, e.g., for a 20:1 scale-up from pilot plant operation when the system includes two reactors, rather than a 40:1 scale-up with a larger reactor. This significantly reduces the uncertainties associated with scaling up pilot plant data.

A multiple reactor system which embodies the concepts and principles of the invention is illustrated in FIG. 2, where it is identified broadly by the reference numeral 200. System 200 includes two reactors 202a and 202b, which as shown are connected for parallel operation on both the reaction side and on the cooling fluid side. In addition, each reactor 202a, 202b, desirably has its own respective recirculation system, 204a, 204b. Ideally, the reactors 202a and 202b may be identical. However, in accordance with the broad aspects of the invention, it is not a critical feature of the invention for the reactors to be identical.

Ideally, the reactors 202a, 202b may each be essentially the same as the reactor 100 illustrated in FIG. 1. That is to say, the reactors 202a, 202b may each be a two-pass reactor, with each pass including one hundred ninety four ⅜" tubes as described above. Other equipment shown in FIG. 2 which is essentially the same as the corresponding equipment shown in FIG. 1 is identified by similar reference numerals followed by either an "a" or a "b" as the case may be. Thus, the reactors 202a, 202b each include a feedstock inlet line (15a, 15b), a recirculation pump (25a, 25b), a recirculation pump suction line (20a, 20b), a product outlet line (55a, 55b), a catalyst composition inlet line (30a, 30b) and a methanol inlet line (16a, 16b). In FIG. 2, a common feedstock inlet line for the multiple reactor system 200 is identified by the reference numeral 215, and a common product outlet line for the multiple reactor system 200 is identified by the reference numeral 255.

The multiple reactor system of the invention offers advantages in conversion and polymer polydispersity. The multiple reactor system of the invention also facilitates a reduction in the amount of off-spec material generated during early operation of the unit because equilibrium and the development of the operating parameters necessary for a particular product are achieved more expeditiously.

The optimum inlet feedstock flow rate for each reactor of the multiple reactor system 200 of the invention is about fifteen to seventeen gal/min with appropriate refrigeration capacity and back-end processing capabilities. That is to say, with the multiple reactor system 200 of the invention, higher conversions (70–75%) are possible at this flow rate than higher flow rates (>20 gal/min per reactor). This is the result of increased residence times in the range of from about 120 to 135 seconds. Higher conversion rates lead to improvements (reductions) in polydispersity, and a polydispersity of about 1.7 is achievable through the use of the multiple reactor system 200 of the invention for the production of a PIB product having a number average molecular weight ($M_N$) of about 950, and a polydispersity of about 2.2 is achievable through the use of the multiple reactor system 200 of the invention for the production of a PIB product having a $M_N$ of about 2300. When using a single reactor to produce the same molecular weight products, the best polydispersities that could be achieved were 1.9 and 2.3 respectively.

For the dual reactor system described above, the feedstock and product withdrawal flow rates may preferably be chosen such that the residence time of the reaction mixture within each reactor may be, for example, about 4 minute or less, about 3 minutes or less, ideally from about 120 to about 135 seconds, perhaps even less than about 2 minutes, and potentially even as low as about 1 minute or less.

The multiple reactor system 200 of the invention also facilitates the use of smaller reactors having improved pressure drop characteristics resulting in more efficient energy usage. This may be due at least in part to the fact that larger reactors may require longer reactor tubes with similar recirculation linear flow rates.

EXAMPLE

Tests were conducted to determine the improvements in operational characteristics achievable through the use of a multiple reactor system, in this case using two similar reactors operating in parallel. According to the test protocol, the tests were conducted in three phases. In these phases, all operating parameters other than those specifically spelled out were held constant. In the first phase, a single reactor was operated in a manner to produce a highly reactive polyisobutylene having terminal double bond content greater than 70% and a $M_N$ of approximately 1600. The feedstock was an isobutylene concentrate and the recirculation rate was maintained at a level to achieve intimate intermixing between the catalyst composition and the reactants and a heat transfer coefficient appropriate to provide proper cooling. The single reactor was initially operated with a feedstock inlet rate of 27 gpm. Later, this was increased to 32 gpm. In the second phase, two reactors were operated in parallel. These parallel reactors were each essentially the same as the reactor employed during the first phase. During this phase, the feedstock inlet rate to each reactor was 15 gpm. And again, the recirculation rate was maintained at a level to achieve intimate intermixing between the catalyst composition and the reactants and a heat transfer coefficient appropriate to provide proper cooling. In the third phase, the setup was the same as in the second phase. As an initial step in this third phase, the conversion rate was increased while the feedstock

TABLE 6

Summary of Rate Test Results

| Test Phase[a] | Test Duration | Reactor | Hydrocarbon Feed Flow (gpm) | Reactor Temp. (° F.) | Heat Balance Conv. (%) | Reactor Make Rate (lb/min) | Refrigeration Data Row (gpm) | Supply Temp (° F.) | Required Tons |
|---|---|---|---|---|---|---|---|---|---|
| 1 | 22 hrs. | A | 31.7 | 70 | 62 | 89.6 | 593 | 29.4 | 164 |
| 2 | 45 hrs | A | 15 | 64.5 | 67 | 45.9 | 257 | 38.8 | 86 |
|  |  | B | 15 | 64.5 | 67 | 45.9 | 252 | 38.8 | 87 |
|  |  |  | 30 |  |  | 91.8 | 509 |  | 173 |
| 3.1 | 22 hrs and 40 min. | A | 15 | 64 | 73 | 49.9 | 244 | 29.8 | 95 |
|  |  | B | 15 | 64 | 73 | 49.9 | 249 | 29.8 | 95 |
|  |  |  | 30 |  |  | 99.8 | 493 |  | 189 |

TABLE 6-continued

Summary of Rate Test Results

| Test Phase[a] | Test Duration | Reactor | Hydrocarbon Feed Flow (gpm) | Reactor Temp. (° F.) | Heat Balance Conv. (%) | Reactor Make Rate (lb/min) | Refrigeration Data Row (gpm) | Supply Temp (° F.) | Required Tons |
|---|---|---|---|---|---|---|---|---|---|
| 3.2 | 3 hrs and 10 min. | A | 17 | 64 | 68 | 52.6 | 244 | 31.3 | 99 |
|  |  | B | 17 | 64 | 68 | 52.6 | 249 | 31.3 | 99 |
|  |  |  | 34 |  |  | 105.2 | 493 |  | 198 |

[a]Phase 1 — One reactor, increased feed rate to maximize reactor make rate
[a]Phase 2 — Two reactors at baseline feed rates of 15 gpm, 38.8° F. chilled water
[a]Phase 3.1 — Two reactors at 15 gpm, decreased chilled water temperature to maximize conversion
[a]Phase 3.2 — Two reactors, increased feed rate to maximize reactor make rate inlet rate to each reactor was maintained at 15 gpm, then the chilled water supply to the shell side of the reactors was reduced to increase the conversion rate. Thereafter, the feedstock inlet rate to each reactor was increased to 17 gpm. The results of these tests are summarized below in Table 6.

Table 6 presents the length of each test phase, feed flow rate, reaction temperature, heat balance conversion, reactor make rate, and refrigeration system data. The heat balance conversion was estimated based on the feed flow, heat of reaction, and the chilled water flow and temperature increase across the reactor. The chilled water flow and temperature increase determine the amount of heat generated by the reaction, and the heat of reaction and feed flow are used to calculate the percentage of the feed converted to PIB and oligomers. The reactor make rate, in pounds per minute (lb/min), is calculated from the feed rate and heat balance conversion.

During single reactor operation, the reactor make rate was maximized at 88 lb/min with the feed rate at 31.7 gpm. When the feed rate was increased to 32 gpm, the reactor make rate began to drop, so the feed rate was not increased any further. The highest reactor make rate was achieved during two reactor operation at a feed rate to each reactor of 17 gpm. While at 15 gpm feed to each reactor, the reactor make rate was increased from 45.9 lb/min per reactor (91.8 lb/min total) to 49.9 lb/min per reactor (99.8 lb/min total) by reducing the chilled water supply temperature from 38° F. to 30° F. The reactor make rate was increased further to 52.6 lb/min per reactor (105.2 lb/min total) by increasing the feed rates to each reactor from 15 gpm to 17 gpm.

During Phase 1 of the test program, the feed rate was held at 30.5 gpm for about 8 hours. A direct comparison can be made between one and two reactor operation by comparing the conversion during this period with the conversion obtained during Phase 3.1. During Phase 1, the feed rate was slightly higher (30.5 versus 30 gpm), but the chilled water supply temperature was slightly lower (28° F. versus 30° F. during Phase 3.1). With two-reactor operation, the heat balance conversion was 73% versus 64% for one reactor operation, even though the reactor temperatures were operated 5° F. cooler when operating two reactors (64° F. versus 69° F.). With two-reactor operation, there is twice the residence time and twice the surface area for removing heat compared to the single reactor case. The additional residence time explains why the reactor temperature had to be lowered, and the additional surface area explains why the conversion was higher even at the lower reaction temperature.

In view of the foregoing, it can readily be seen that when two reactors are used in parallel, conversion rates are increased and polydispersity is lowered relative to a single reactor. This result is achieved because the multiple reactor concept facilitates a lower feed rate to each reactor with a concomitant increase in the residence time.

As mentioned above, product exiting the polymerization reactor system via lines 55 (FIG. 1) or 255 (FIG. 2) should be quenched immediately with a material capable of killing the activity of the catalyst, such as, for example, ammonium hydroxide. Thus, any potential undesired decrease in molecular weight or rearrangement of the polymer molecule may be minimized. The polyolefin products of the invention may then be directed to a work up system, including a wash system as described below where catalyst salts may be removed.

Figure 3:
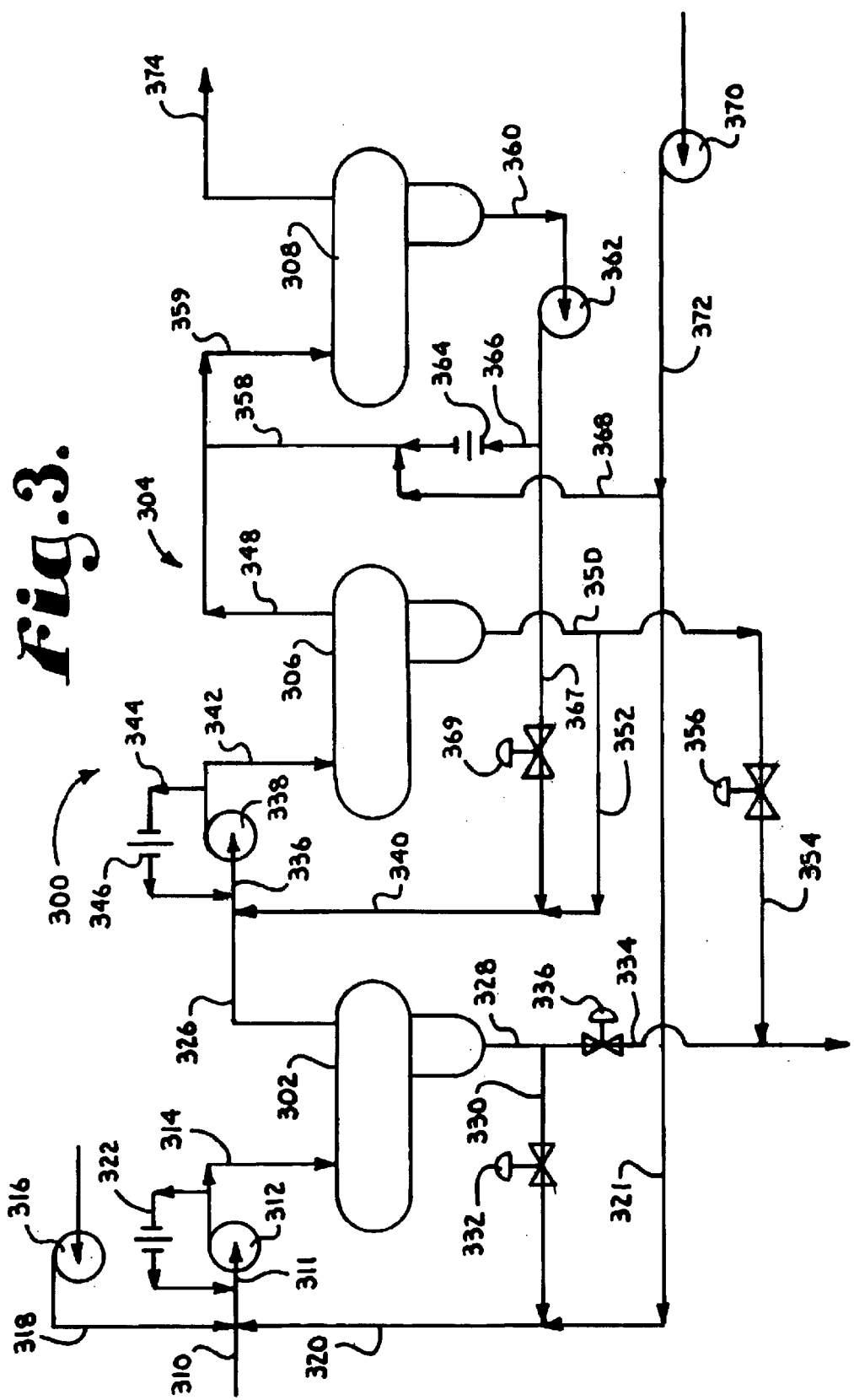
FIG. 3 is a flow diagram illustrating a system for receiving a crude polyolefin product from the apparatuses of FIGS. 1 and 2, for example, and treating the same to wash the crude product and remove residual catalyst therefrom.

In FIG. 3, a wash system which embodies the concepts and principles of another aspect of the invention is identified broadly by the reference numeral 300. As shown, the system 300 includes an upstream settler vessel 302 and a downstream settler system 304 which, in the preferred embodiment of this aspect of the invention shown in FIG. 3, includes two downstream settler vessels 306, 308. It is to be noted here, that in the alternative, the downstream settler system 304 could just as well include only a single settler vessel or three or more settler vessels, depending upon the nature of the product and the nature of the residual catalyst materials to be removed therefrom.

System 300 further includes an inlet line 310 which interconnects either line 55 or line 255, as the case may be, and the suction 311 of a pump 312 which pumps crude product and materials intermixed therewith into settler vessel 302 via line 314. An agent for killing the activity of any residual catalyst in the crude product entering system 300 via line 310 is introduced into line 310 via pump 316 and line 318. NH$_4$OH in an aqueous solution is a particularly good agent for killing the activity of any residual BF3/methanol complex in the polyolefin product. However, the invention is in no way limited to the use of NH$_4$OH. Rather, the exact nature of the catalyst activity killing agent will depend entirely upon the nature of the catalyst itself and/or the nature of the product in the product stream.

Wash water is introduced into and admixed with the crude product in line 316 via a line 320. The admixture of crude product containing residual catalyst composition, the catalyst activity killing agent and the wash water is introduced into the pump 312 via suction line 311. Desirably, the pump 312 may be centrifugal pump wherein the rotation of the impellers insures that the water, catalyst salts resulting from the interaction between the catalyst activity killing agent and the catalyst and the crude polyolefin product are intimately intermixed such that thorough washing is achieved. In addition, pump 312 may be provided with a recycle line 322, including a flow controlling device 324, to return a portion of the admixture to the pump suction for additional mixing.

The admixture of hydrocarbon product, killed catalyst salts and water are introduced via line 314 into an internal settlement chamber of the settlement vessel 302 where the hydrocarbon phase is separated from the aqueous phase under the influence of gravitational forces in a manner that is known per se. Desirably, in this latter regard, the interaction between the catalyst activity killing agent and the catalyst forms a water-soluble salt such that the bulk of such salt will be present in the aqueous phase.

The upper, partially washed crude polyolefin product phase is removed from vessel 302 via an overhead line 326 and the aqueous phase leaves vessel 302 via a line 328. A portion of the removed aqueous phase is recycled to the wash water inlet line 320 via return line 330 and a flow controller 332. Another portion of the removed aqueous phase is discarded from the system via a drain line 334 and a level controller 336 which controls the level of the aqueous phase in vessel 302. Drain line 334 is connected to a system (not shown) for either reclamation or disposal of the used and contaminated wash water.

Make-up wash water for vessel 302, which desirably may be demineralized water, is added to the recycled drain water in line 320 via a line 321. In this connection it is to be noted that the respective amounts of make-up wash water, incoming catalyst killing agent, and purged aqueous phase should all be controlled so as to insure that the amount of killing agent entering the system is always in an excess relative to the amount of residual catalyst in the crude product.

The partially washed crude polyolefin product phase in line 326 is introduced into the suction 336 of a pump 338 along with additional wash water delivered via line 340. Pump 338 may desirably be a centrifugal pump like pump 312 to ensure intimate admixing between the water phase and the hydrocarbon phase before the admixture is delivered via line 342 into vessel 306. Pump 338 may also be equipped with a recycle line 344 and a flow controlling device 346 to return a portion of the admixture to the pump suction 336 for additional mixing. The two phase admixture in vessel 306 is allowed to separate under the influence of gravity to form an upper hydrocarbon phase and a lower aqueous phase.

An upper, more thoroughly washed crude polyolefin product phase is removed from vessel 306 via another overhead line 348, and the lower settled aqueous phase leaves vessel 306 via a line 350. A portion of the removed aqueous phase is recycled to wash water inlet line 340 via return line 352 and another portion of the removed aqueous phase is purged from the system via a drain line 354 and a level controller 356 which controls the level of the aqueous phase in vessel 306. Drain line 354 is connected to drain line 334.

The more thoroughly washed crude polyolefin product phase in line 348 is admixed with additional wash water which is introduced via line 358. The admixture of crude polyolefin product phase and additional wash water is introduced into settler vessel 308 via a line 359 where once again the two phase admixture is allow to separate under the influence of gravity. The lower aqueous phase is removed from vessel 308 under the influence of a pump 362 via a lower line 360, and a portion thereof is recycled to line 348 via a flow controller device 364, a return line 366 and line 358. Another portion of the aqueous phase leaving vessel 308 is recycled via line 367 and flow controller 369 and introduced into line 340 for use as make-up wash water in vessel 306.

The completely washed crude polyolefin product is removed from vessel 308 via an overhead line 374 and forwarded to a downstream purification system (not shown) for the removal of diluents, unreacted monomer, and unwanted light ends such as dimers, trimers, oligomers, etc.

Fresh make-up wash water for vessel 308, which once again may desirably be demineralized water, is introduced via line 368. The make-up water is introduced into the system via a pump 370 and line 372. In this regard it is to be noted that line 372 is connected with line 321 to provide fresh make-up water for upstream vessel 302 and with line 368 to separately and independently provide fresh make-up water for downstream settler system 304. Accordingly, extra make-up water may be introduced into the downstream settler system 304 without unnecessarily diluting the catalyst activity killing agent ($NH_4OH$) needed in the upstream settler vessel 302. This result is achieved because the wash system for the upstream vessel is operated completely independently of the wash system for the downstream settler system 304. It is also noteworthy that the concentration of the catalyst activity killing agent in the aqueous phase of the upstream settler vessel 302 should always be in excess relative to the amount of residual catalyst. Moreover, the concentration of the catalyst salts in the aqueous phase should always be low enough to avoid precipitation. Accordingly, the amount of fresh make-up water introduced into the upstream settler vessel 302 needs to be closely controlled, while the amount of fresh make-up water introduced into the downstream settler system should be copious and determined solely by the need for removing as much contamination from the final product as possible. Thus, a lower flow of fresh make-up water is used in the upstream settler vessel to minimize the usage of the catalyst activity killing agent, while a much greater flow of fresh make-up water is used in the downstream settler system to provide for better washing.

We claim:

1. A method for treating a catalytically formed crude polyolefin product containing residual catalyst to avoid further reaction in the product and remove residual catalyst therefrom, said method comprising:

intimately admixing crude residual catalyst containing polyolefin product and a first aqueous media containing a catalyst killing agent to thereby form a first intimately admixed two phase, gravity separable mixture;

introducing said first two phase mixture into a first settlement zone and allowing the same to settle in said first zone under the influence of gravity to present an upper partially washed crude polyolefin product phase and a first lower aqueous phase containing dissolved catalyst salts;

withdrawing said first lower aqueous phase from said first settlement zone and recirculating a first portion thereof and introducing the same into said first two phase mixture for inclusion as part of said first aqueous media;

directing a second portion of said first lower aqueous phase to a drain for disposal or reclamation;

introducing a first quantity of make-up water into said first two phase mixture for inclusion as part of said first aqueous media;

withdrawing said partially washed crude polyolefin product phase from said first settlement zone and intimately admixing the same with a second aqueous media to thereby form a second intimately admixed two phase, gravity separable mixture;

introducing said second two phase admixture into a second settlement zone and allowing the same to settle in said second zone under the influence of gravity to present an upper more fully washed crude polyolefin product phase and a second lower aqueous phase;

withdrawing said second lower aqueous phase from said second settlement zone and recirculating a first portion thereof and introducing the same into said second two phase mixture for inclusion as part of said second aqueous media;

directing a second portion of said second lower aqueous phase to a drain for disposal or reclamation;

removing said more fully washed crude polyolefin product phase from said second settlement zone; and introducing a second separate quantity of make-up water into said second two phase mixture for inclusion as part of said second aqueous media.

2. A method as set forth in claim 1, wherein said catalyst comprises $BF_3$ and said catalyst killing agent comprises $NH_4OH$.

3. A method as set forth in claim 1, wherein said intimately admixing operations are performed using centrifugal pumps.

4. A method as set forth in claim 1, wherein said make-up water comprises demineralized water.

5. A method as set forth in claim 1, wherein said catalyst killing agent is maintained in said first aqueous media at a level which is in excess relative to the amount needed to completely kill the catalyst.

6. A method for washing a crude polyolefin product to remove residual catalyst therefrom, said method comprising:

forming a first intimately admixed two phase admixture comprising a crude olefin polymerization product containing residual catalyst and a first aqueous media containing a catalyst killing agent;

introducing said first two phase admixture into a first settlement zone and causing said first two phase admixture to settle in said zone under the influence of gravity to present an upper partially washed crude polyolefin product phase and a first lower aqueous phase containing dissolved catalyst salts;

removing said first lower aqueous phase from said first settlement zone and recirculating a first portion thereof for inclusion in said first two phase admixture as part of said first aqueous media;

directing a second portion of said first lower aqueous phase to a drain for disposal or reclamation;

removing said partially washed crude polyolefin product phase from said first settlement zone and intimately admixing the same with a second aqueous media to thereby form a second two phase admixture;

introducing said second two phase admixture into a second settlement zone and causing said second two phase admixture to settle therein under the influence of gravity to present an upper intermediately washed crude polyolefin product phase and a second lower aqueous phase;

removing said second lower aqueous phase from said second settlement zone and recirculating a first portion thereof for inclusion in said second two phase admixture as part of said second aqueous media;

directing a second portion of said second lower aqueous phase to a drain for disposal or reclamation;

removing said intermediately washed crude polyolefin product phase from said second settlement zone and admixing the same with a third aqueous media to thereby form a third two phase admixture;

introducing said third two phase admixture into a third settlement zone and causing said third two phase admixture to settle therein under the influence of gravity to present an upper more fully washed crude polyolefin product phase and a third lower aqueous phase;

removing said third lower aqueous phase from said third settlement zone and recirculating a first portion thereof for inclusion in said third two phase admixture as part of said third aqueous media;

recirculating a second portion of said third lower aqueous phase for inclusion in said second intimately admixed two phase admixture as part of said second aqueous media;

introducing a first quantity of make-up water into said first intimately admixed two phase admixture for inclusion therein as part of said first aqueous media; and introducing a second separate quantity of make-up water into said third intimately admixed two phase admixture for inclusion therein as part of said third aqueous media.

\* \* \* \* \*

UNITED STATES PATENT AND TRADEMARK OFFICE
CERTIFICATE OF CORRECTION

| | |
|---|---|
| PATENT NO. | : 6,777,506 B1 |
| DATED | : August 17, 2004 |
| INVENTOR(S) | : C. Edward Baxter, Jr. et al. |

Page 1 of 1

It is certified that error appears in the above-identified patent and that said Letters Patent is hereby corrected as shown below:

Title page,
Item [75], Inventors, delete "Russel T. Reid, Sr." and insert -- Russel E. Reid, Sr. -- therefore.

Signed and Sealed this

Fourth Day of January, 2005

JON W. DUDAS
*Director of the United States Patent and Trademark Office*